(12) United States Patent
Sampath et al.

(10) Patent No.: US 9,301,266 B2
(45) Date of Patent: Mar. 29, 2016

(54) BEACONS FOR WIRELESS COMMUNICATION

(75) Inventors: Hemanth Sampath, San Diego, CA (US); Simone Merlin, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/588,293

(22) Filed: Aug. 17, 2012

(65) Prior Publication Data

US 2013/0279381 A1 Oct. 24, 2013

Related U.S. Application Data

(60) Provisional application No. 61/525,353, filed on Aug. 19, 2011.

(51) Int. Cl.
| | | |
|---|---|---|
| *H04L 12/28* | (2006.01) | |
| *H04W 56/00* | (2009.01) | |
| *H04W 48/08* | (2009.01) | |
| *H04J 1/16* | (2006.01) | |

(52) U.S. Cl.
CPC .............. *H04W 56/00* (2013.01); *H04W 48/08* (2013.01)

(58) Field of Classification Search
CPC .. H04W 40/244; H04W 52/325; H04W 56/00
USPC .................. 370/252, 329, 389, 386
See application file for complete search history.

(56) References Cited

U.S. PATENT DOCUMENTS

| | | |
|---|---|---|
| 5,371,734 A | 12/1994 | Fischer |
| 5,987,062 A | 11/1999 | Engwer et al. |
| 6,011,784 A | 1/2000 | Brown et al. |
| 6,351,468 B1 | 2/2002 | LaRowe, Jr. et al. |
| 7,221,680 B2 | 5/2007 | Vijayan et al. |
| 7,693,508 B2 | 4/2010 | Leung et al. |
| 7,916,687 B2 | 3/2011 | Deshpande et al. |
| 8,170,002 B2 | 5/2012 | Wentink |
| 2003/0193895 A1 | 10/2003 | Engwer et al. |
| 2004/0141523 A1 | 7/2004 | Bhushan et al. |

(Continued)

FOREIGN PATENT DOCUMENTS

| | | |
|---|---|---|
| EP | 1542488 A1 | 6/2005 |
| EP | 1821248 A2 | 8/2007 |

(Continued)

OTHER PUBLICATIONS

International Search Report and Written Opinion—PCT/US2012/051606—ISA/EPO—Mar. 1, 2013.

(Continued)

*Primary Examiner* — John Pezzlo
(74) *Attorney, Agent, or Firm* — Kevin T. Cheatham

(57) ABSTRACT

A system and method for wireless devices to efficiently receive communications by transmitting and receiving specialized beacon messages. Particularly, a wireless device may await reception of a synchronizing beacon message from a transmitting device. A relative position identifier within the synchronizing beacon message may then allow the wireless device to anticipate future beacon message transmissions and to synchronize its reception pattern with the transmitter. In this manner the wireless device need only receive and decode beacon messages germane to its operation.

112 Claims, 10 Drawing Sheets

(56) References Cited

U.S. PATENT DOCUMENTS

| | | |
|---|---|---|
| 2004/0253996 A1 | 12/2004 | Chen et al. |
| 2005/0227615 A1 | 10/2005 | Sakoda |
| 2005/0249183 A1 | 11/2005 | Danon et al. |
| 2005/0286446 A1 | 12/2005 | Barber |
| 2006/0089138 A1 | 4/2006 | Smith et al. |
| 2006/0146769 A1* | 7/2006 | Patel et al. ............ 370/338 |
| 2006/0285507 A1* | 12/2006 | Kinder et al. ............ 370/310 |
| 2007/0014267 A1 | 1/2007 | Lam et al. |
| 2007/0064655 A1 | 3/2007 | Ruuska |
| 2007/0195899 A1 | 8/2007 | Bhushan et al. |
| 2007/0242645 A1 | 10/2007 | Stephenson et al. |
| 2007/0286152 A1 | 12/2007 | Prakash et al. |
| 2008/0051087 A1* | 2/2008 | Ryu et al. ............ 455/436 |
| 2008/0069150 A1 | 3/2008 | Badt et al. |
| 2008/0075217 A1 | 3/2008 | Ilnicki et al. |
| 2008/0095126 A1 | 4/2008 | Mahany et al. |
| 2008/0123619 A1 | 5/2008 | Ko et al. |
| 2010/0002627 A1* | 1/2010 | Ngo et al. ............ 370/328 |
| 2010/0046441 A1* | 2/2010 | Vermani et al. ............ 370/329 |
| 2010/0054168 A1 | 3/2010 | Igarashi et al. |
| 2010/0056160 A1 | 3/2010 | Kim et al. |
| 2010/0080266 A1 | 4/2010 | Zhang et al. |
| 2010/0111066 A1* | 5/2010 | Mehta ............ 370/345 |
| 2010/0130122 A1* | 5/2010 | Sridhar et al. ............ 455/3.01 |
| 2010/0142493 A1 | 6/2010 | Sakoda et al. |
| 2010/0150118 A1 | 6/2010 | Daum |
| 2010/0232337 A1* | 9/2010 | Das et al. ............ 370/312 |
| 2011/0205969 A1 | 8/2011 | Ahmad et al. |
| 2011/0305288 A1 | 12/2011 | Liu et al. |
| 2013/0057434 A1* | 3/2013 | Krasner ............ G01S 5/0263 342/387 |
| 2013/0271288 A1* | 10/2013 | Liang et al. ............ 340/870.01 |

FOREIGN PATENT DOCUMENTS

| | | |
|---|---|---|
| EP | 2109333 A1 | 10/2009 |
| EP | 2207278 A1 | 7/2010 |
| EP | 2282582 A1 | 2/2011 |
| JP | 2009231866 A | 10/2009 |
| JP | 2010081603 A | 4/2010 |
| JP | 2013519331 A | 5/2013 |
| WO | 2006086878 A1 | 8/2006 |
| WO | 2006138058 A2 | 12/2006 |
| WO | WO-2007103888 A1 | 9/2007 |
| WO | 2008066318 A1 | 6/2008 |
| WO | 2008074260 A1 | 6/2008 |
| WO | 2008100078 A1 | 8/2008 |
| WO | 2010068405 A2 | 6/2010 |
| WO | WO-2011099729 A2 | 8/2011 |

OTHER PUBLICATIONS

Shwe, et al., "Efficient power savings in wireless sensor networks with network coding and overhearing avoidance," International Journal of Computer Engineering Research, Mar. 2011, vol. 2(2), pp. 34-44.

European Search Report—EP14185131—Search Authority—The Hauge—Feb. 19, 2015.

* cited by examiner

BEACONS FOR WIRELESS COMMUNICATION

CLAIM OF PRIORITY UNDER 35 U.S.C. §119

The present application for patent claims priority to Provisional Application No. 61/525,353 entitled "BEACONS FOR WIRELESS COMMUNICATION" filed Aug. 19, 2011, and assigned to the assignee hereof and hereby expressly incorporated by reference herein.

BACKGROUND

1. Field

The present application relates generally to wireless communications, and more specifically to systems, methods, and devices for communicating device information between electronic devices in packets having a plurality of different formats.

2. Background

In many telecommunication systems, communications networks are used to exchange messages among several interacting spatially separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc rather than fixed topology. Wireless networks may employ electromagnetic waves in the radio, microwave, infrared, or optical frequency bands. Wireless networks advantageously facilitate user mobility and rapid field deployment when compared to fixed wired networks.

The devices in a wireless network may transmit/receive information between each other. The information may comprise packets, which in some aspects may be referred to as data units, data beacons, or beacon messages. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Access points may also broadcast information to other nodes that is relevant to communications in the network. Such transmission of information may require use of significant bandwidth in the network. Thus, improved systems, methods, and devices for communicating packets are desired.

SUMMARY

The systems, methods, and devices of the embodiments disclosed herein each have several aspects, no single one of which is solely responsible for its desirable attributes. Without limiting the scope of this invention as expressed by the claims that follow, some features are discussed briefly below. After considering this discussion, and particularly after reading the section entitled Detailed Description," it will be understood how embodiments within the scope of the invention include systems and methods for communicating device information between electronic devices in packets having a plurality of different formats.

One embodiment is a wireless communication device. The device comprises a receiver configured to receive a sequence of beacon messages comprising a first beacon message and a plurality of subsequent beacon messages. The first beacon message comprises at least one of content information and timing information of at least one of the plurality of subsequent beacon messages. The device further comprises a processor electrically coupled to the receiver and configured to decode a proper subset of the plurality of subsequent beacon messages based on at least one of the content information and the timing information.

Another embodiment is a method of communication. The method comprises receiving a sequence of beacon messages comprising a first beacon message and a plurality of subsequent beacon messages. The first beacon message comprises at least one of content information and timing information of at least one of the plurality of subsequent beacon messages. The method further comprises decoding a proper subset of the plurality of subsequent beacon messages based on at least one of the content information and the timing information.

Another embodiment is a wireless communication device. The device comprises means for receiving a sequence of beacon messages comprising a first beacon message and a plurality of subsequent beacon messages. The first beacon message comprises at least one of content information and timing information of at least one of the plurality of subsequent beacon messages. The device further comprises means for decoding a proper subset of the plurality of subsequent beacon messages based on at least one of the content information and the timing information.

Another embodiment provides a computer readable medium comprising instructions. The instructions when executed cause an apparatus to receive a sequence of beacon messages comprising a first beacon message and a plurality of subsequent beacon messages. The first beacon message comprises at least one of content information and timing information of at least one of the plurality of subsequent beacon messages. The instructions when executed further cause the apparatus to decode a proper subset of the plurality of subsequent beacon messages based on at least one of the content information and the timing information.

Another embodiment is a method, system, or article of manufacture comprising instructions for communicating beacon messages in a base station subsystem comprising an access point and an access terminal. The method, system or article of manufacture includes transmitting from the access point to the access terminal a repeating finite sequence of beacon messages, the sequence comprising a first beacon message comprising a relative position identifier to indicate timing of subsequent beacon messages in the finite sequence and to identify content contained in the subsequent beacon messages, the subsequent beacon messages including information not contained in the first beacon message. The method, system, or article of manufacture also includes decoding at the access terminal the first beacon message and a proper subset of the sequence of beacon messages based upon the relative position identifier, the access terminal in a low power state during transmission of a second subset of sequence of beacon messages, the second subset of beacon messages comprising beacon messages not in the proper subset and not including the first beacon message.

Another embodiment is a method, system, or article of manufacture comprising instructions for communicating in a base station subsystem. The base station subsystem includes an access point and an access terminal, where the base station subsystem is identified by a BSSID (Basic Service Set Identification). The method, system, or article of manufacture includes transmitting beacon messages from the access point to the access terminal, each beacon message an instance of a full beacon message type or an instance of a short beacon message type. The method, system, and article of manufacture also includes transmitting beacon messages of the short beacon message type at a first time interval, and transmitting full beacon messages of the full beacon message type at a second time interval, the second time interval equal to an integer multiple of the first time interval; wherein each beacon message of the short beacon message type includes a compressed BSSID field having a value indicative of a cyclic redundancy check of the BSSID.

Another embodiment is a method, system, or article of manufacture comprising instructions for communicating beacon messages in a base station subsystem comprising an access point and an access terminal. The method, system, or article of manufacture for decoding by the access terminal a first beacon message providing an absolute time; and decoding by the access terminal a second beacon message subsequent to the first beacon message, the second beacon message comprising a sequence number relative to the first beacon message and a time offset, the time offset indicating a time difference between when the second beacon message was scheduled to be transmitted by the access point and when it actually was transmitted.

Another embodiment is a method, system, or article of manufacture having instructions for communicating a set of information elements in a base station subsystem comprising an access point and an access terminal. The method, system, or article of manufacture transmitting beacon messages from the access point to the access terminal, each beacon message an instance of a full beacon message type or an instance of a short beacon message type, wherein each beacon message of the full beacon message type comprises the set of information elements; and transmitting a plurality of beacon messages of the short beacon message type, each beacon message in the plurality of beacon messages comprising a proper subset of the set of information elements, wherein the plurality of beacon messages comprises the set of information elements.

Another embodiment is a method, system, or article of manufacture having instructions for communicating in a base station subsystem comprising an access point and an access terminal. The method, system, or article of manufacture transmitting beacon messages from the access point to the access terminal, each beacon message an instance of a full beacon message type or an instance of a short beacon message type; and transmitting a first beacon message comprising content information, the content information specifying content of information contained in beacon messages of the short beacon message type transmitted subsequently to the first beacon message.

Another embodiment is a method, system, or article of manufacture having instructions for communicating in a base station subsystem comprising an access point and an access terminal. The method, system, or article of manufacture transmitting beacon messages from the access point to the access terminal, each beacon message an instance of a full beacon message type or an instance of a short beacon message type; transmitting a plurality of beacon messages of the short beacon message type, each beacon message in the plurality of beacon messages comprising a physical layer preamble comprising a SIG field, the SIG field comprising a length field; and decoding at the access terminal the plurality of beacon messages, wherein beacon messages in the plurality of beacon messages are decoded as synchronization beacon messages provided their length field is set to all zeroes.

DETAILED DESCRIPTION

Figure 1:
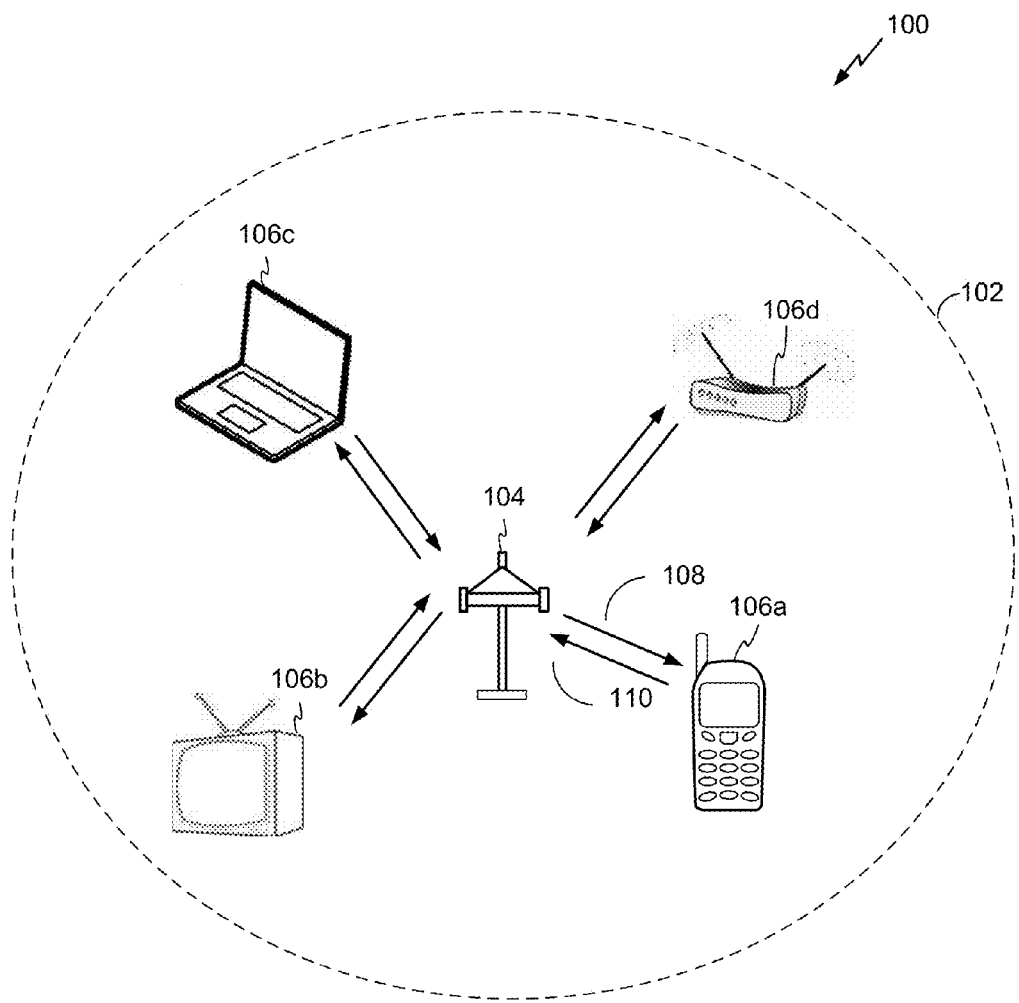
FIG. 1 illustrates an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method that is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices that are the components that access the wireless network. For example, there may be two types of devices: an access point (AP) and a client. A client may also be referred to as an access terminal (AT) or a station (STA). In general, an access point may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point (AP) may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station (STA) may also comprise, be implemented as, or known as an access terminal (AT), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon message (or simply a beacon), via a communication link such as the downlink 108, to other nodes STAs 106 of the system 100, which may help the other nodes STAs 106 to synchronize their timing with the AP 104, or which may provide other information or functionality. Such beacon messages may be transmitted periodically. In one aspect, the period between successive transmissions may be referred to as a superframe. Transmission of a beacon message may be divided into a number of groups or intervals. In one aspect, the beacon message may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon message may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon message broadcast by the AP 104. To receive such a beacon message, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
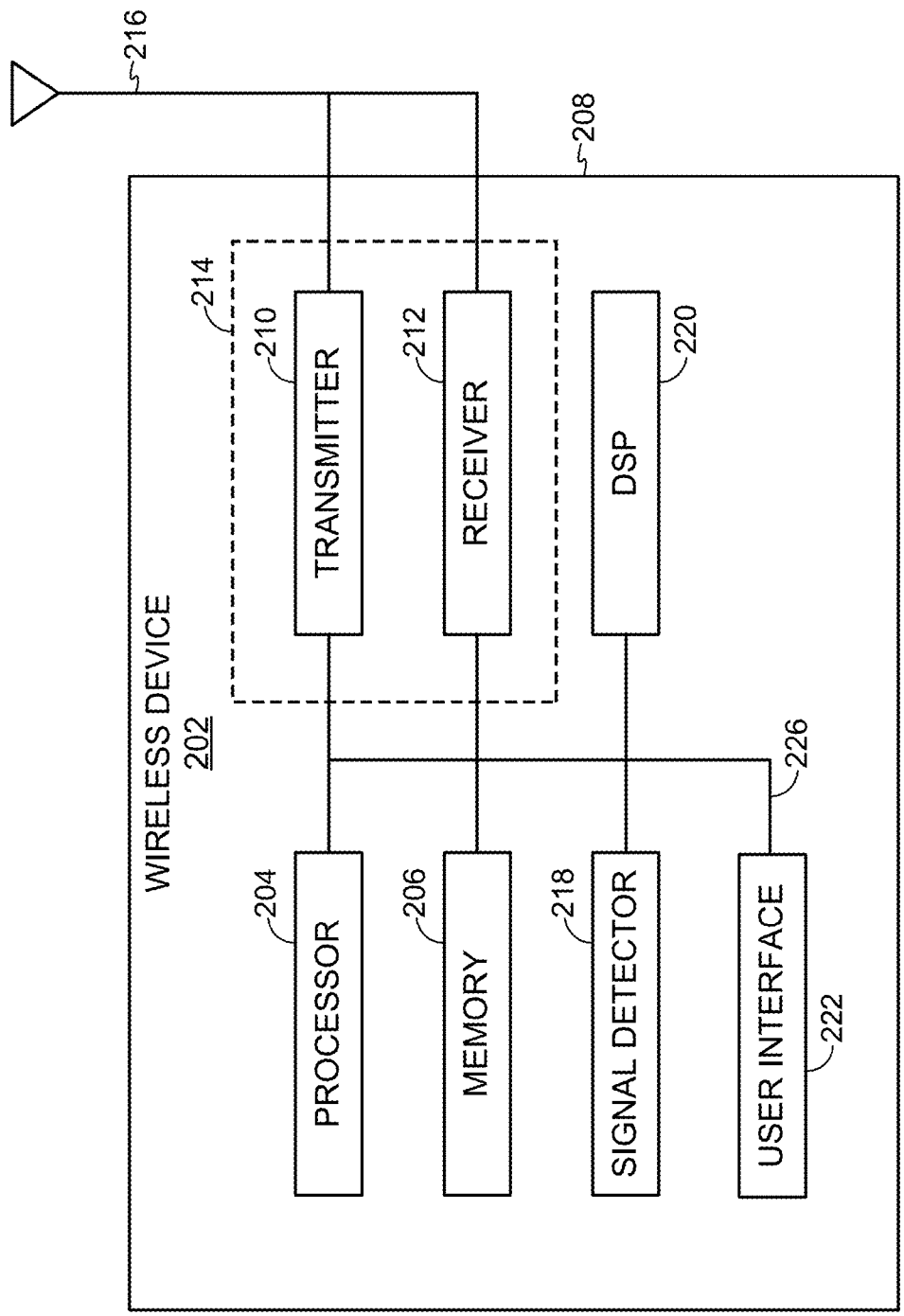
FIG. 2 shows a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 that controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit beacon messages having different beacon message types. For example, the transmitter 210 may be configured to transmit beacon messages with different types of beacons generated by the processor 204, discussed above. When the wireless device 202 is implemented or used as a STA 106, the processor 204 may be configured to process beacon messages of a plurality of different beacon message types. For example, the processor 204 may be configured to determine the type of beacon message used in a beacon message signal and to process the beacon message and/or fields of the beacon message accordingly. When the wireless device 202 is implemented or used as an AP 104, the processor 204 may also be configured to select one of a plurality of beacon message types, and to generate a beacon message having that beacon message type. For example, the processor 204 may be configured to generate a beacon message comprising beacon information and to determine what type of beacon information to use.

The receiver 212 may be configured to wirelessly receive beacon messages having different beacon message types. In some aspects, the receiver 212 may be configured to detect a type of a beacon message used and to process the beacon message accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106, and may be used to transmit and/or receive communications including beacon messages. That is, either AP 104 or STA 106 may serve as transmitter or receiver devices of beacon information. Such communication may be initiated upon receipt of a message from the transmitter device to the receiver device. Certain aspects contemplate signal detector 218 being used by software running on memory 206 and processor 204 to detect the presence of a transmitter or receiver.

To ensure proper communication between the AP 104 and the STA 106 devices, the STA 106 may require information regarding characteristics of the AP 104. For example, the STA 106 may require timing information about the AP 104 in order to synchronize timing of communication between the STA 106 and the AP 104. Additionally or alternatively, the STA 106 may require other information such as a media access control (MAC) address of the AP 104, an identifier of the basic service set (BSS) served by the AP 104, etc. The types of information the STA 106 may require is discussed in further detail below. The STA 106 may determine whether it needs such information independently, such as through software running using memory 206 and processor 204.

Figure 3:
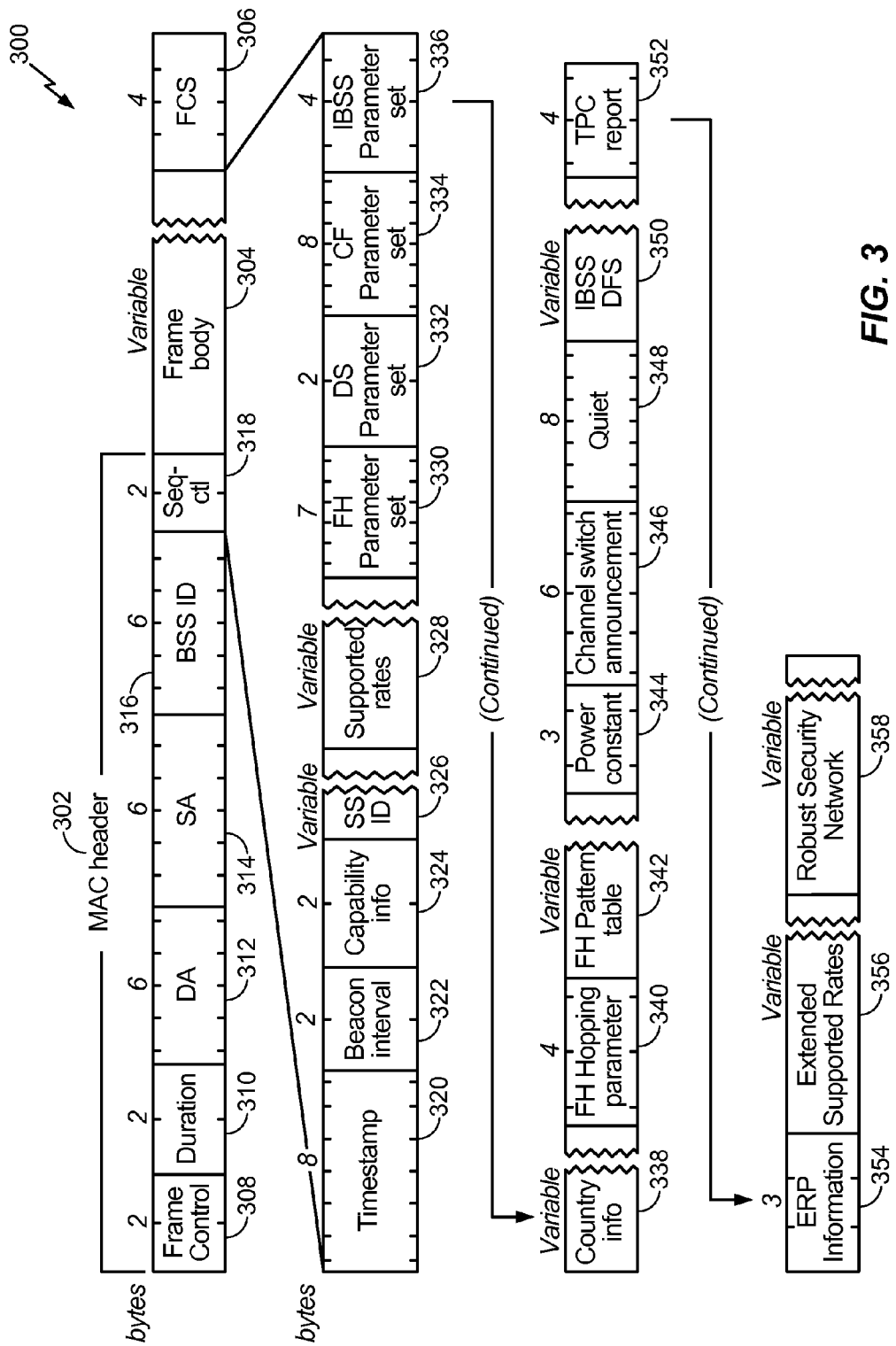
FIG. 3 illustrates an example of a beacon message that may be used in the wireless communication system of FIG. 1.

In certain aspects, the AP 104 may send a beacon message using the transmitter 210 comprising all the desired information. In an aspect, the AP 104 sends beacon messages periodically to synchronize the network and provide basic information to the STAs 106. For example, the beacon message structure may be determined by the AP 104 and transmitted repeatedly at regular intervals to the STAs 106. These beacon messages may be relatively large, as depicted in FIG. 3. Furthermore, they may be sent at very low rates. Thus, there may be considerable overhead in managing these frames.

FIG. 3 illustrates an example of a beacon message frame 300 used in certain communication systems, such as that depicted in FIG. 1. As shown, the beacon message 300 includes a media access control (MAC) header 302, a frame body 304, and a frame control sequence (FCS) 306. As shown in this example, the MAC header 302 is 24 bytes long, the frame body 304 is of variable length, and the FCS 306 is four bytes long.

The MAC header 302 serves to provide basic routing information for the beacon message 300. In the illustrated aspect, the MAC header 302 includes a frame control (FC) field 308, a duration field 310, a destination address (DA) field 312, a source address (SA) field 314, a basic service set identification (BSSID) field 316, and a sequence control field 318. As shown, the FC field 308 is two bytes long, the duration field 310 is two bytes long, the DA field 312 is six bytes long, the SA field 314 is six bytes long, the BSSID field 316 is six bytes long, and the sequence control field 318 is two bytes long.

The frame body 304 serves to provide detailed information about the transmitting node. In the illustrated aspect, the frame body 304 includes a timestamp field 320, a beacon interval field 322, a capability information field 324, a service set identifier (SSID) field 326, a supported rates field 328, a frequency-hopping (FH) parameter set 330, a direct-sequence parameter set 332, a contention-free parameter set 334, an independent basic service set (IBSS) parameter set 336, a country information field 338, a FH hopping parameter field 340, a FH pattern table 342, a power constraint field 344, a channel switch announcement field 346, a quiet field 348, a IBSS direct frequency selection (DFS) field 350, a transmit power control (TPC) field 352, an effective radiated power (ERP) information field 354, an extended supported rates field 356, and a robust security network (RSN) field 358.

As shown in FIG. 3, the timestamp field 320 is eight bytes long, the beacon interval field 322 is two bytes long, the capability information field 324 is two bytes long, the service set identifier (SSID) field 326 is a variable length, the supported rates field 328 is a variable length, the frequency-hopping (FH) parameter set 330 is seven bytes long, the direct-sequence parameter set 332 is two bytes long, the contention-free parameter set 334 is eight bytes long, an independent basic service set (IBSS) parameter set 336 is 4 bytes long, the country information field 338 is a variable length, the FH hopping parameter field 340 is four bytes long, the FH pattern table 342 is a variable length, the power constraint field 344 is three bytes long, the channel switch announcement field 346 is six bytes long, the quiet field 348 is eight bytes long, the IBSS direct frequency selection (DFS) field 350 is a variable length, the transmit power control (TPC) field 352 is four bytes long, an effective radiated power (ERP) information field 354 is three bytes long, an extended supported rates field 356 is a variable length, and the robust security network (RSN) field 358 is a variable length.

The beacon message 300 may include all the information that the STA 106 requires. Accordingly, the STA 106 need only listen to this entire beacon message to obtain all the information the STA 106 requires. However, the STA 106 may not require all of the information included in such a beacon message. For example, the beacon message may contain information the STA 106 already has, or information that is relevant to another STA, but not to the STA 106. Therefore, the STA 106 is required to listen to or decode the additional information in the beacon message, in order to get the information it requires. This requires the STA 106 to spend additional processing power and time in an awake state in order to decode the entire beacon message.

The STA 106 may have a plurality of operational modes. For example, the STA 106 may have a first operational mode referred to as an active mode. In the active mode, the STA 106 may always be in an awake or awakened state and actively transmit/receive data with the AP 104. Further, the STA 106 may have a second operational mode referred to as a power save mode. In the power save mode, the STA 106 may be in the awake state, or a doze or sleep state, where the STA 106 does not actively transmit/receive data with the AP 104. For example, the receiver 212 and possibly DSP 220 and signal detector 218 of the STA 106 may operate using reduced power consumption in the doze state. Further, as discussed above, the STA 106 needs to remain in the awake state to receive a beacon message. Accordingly, if the beacon message is long, the STA 106 needs to stay in an awake state for a longer period of time, thus consuming more power.

For example, although the beacon message 300 has a variable length, it may be at least 89 bytes long, requiring the STA 106 to spend considerable time in an awake state. However, in various radio environments, much of the information contained in the beacon message 300 may be used infrequently or not at all. Accordingly, in low-power radio environments, it may be desirable to reduce the length of the beacon message 300 in order to reduce power consumption. Moreover, some radio environments use low data rates. For example an access point implementing an 802.11ah standard may take a relatively long time to transmit the beacon message 300 due to relatively slow data transmission rates. Accordingly, it may be desirable to reduce the length of the beacon message 300 in order to shorten the amount of time it takes to transmit the beacon message 300.

There are a number of approaches by which the beacon message 300 may be shortened or compressed. In an aspect, one or more fields of the beacon message 300 may be omitted. In another aspect, one or more fields of the beacon message 300 may be reduced in size, for example by using a different encoding scheme or by accepting a lower information content. In one aspect, the wireless system may allow a STA to query the AP for information omitted from a beacon message. For example, the STA may request information omitted from the beacon message via a probe request. In an aspect, a full beacon message may be sent periodically or at a dynamically chosen time.

Accordingly, in certain aspects, the AP 104 may transmit one or more shortened beacon messages. These shortened beacon messages may allow the STA 106 to listen to only certain beacon messages and get only certain information that the STA 106 requires. Accordingly, the STA 106 remains in an awake state for a shortened period of time, thus improving power efficiency. Aspects of shortened beacon messages are with reference to FIGS. 4, 5A, and 5B.

Certain aspects contemplate a mechanism for transmitting shortened beacons of a plurality of different types from the AP 104 to the STAs 106 in certain networks. In particular, certain aspects contemplate transmitting a sequence of multiple short beacon messages carrying different information in different beacon messages. The AP 104, using the processor 204 running software, may determine a plurality of transmit time intervals for transmitting a plurality of beacon messages. The AP 104 may then transmit these beacon messages using the transmitter 210 at the determined intervals. Each beacon message may comprise a (partially) different set of information from its neighbors. This information may comprise information elements (IE) associated with the transmitting device, information about the network, data, etc. The transmit intervals may be constant and repetitive.

Figure 4:
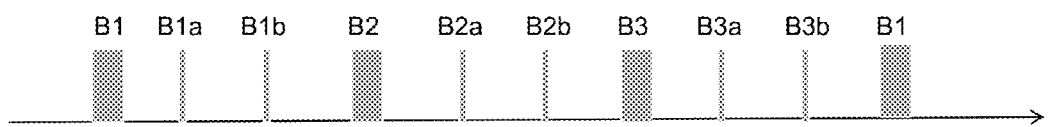
FIG. 4 illustrates a plurality of beacon messages transmitted by the AP 104 to STAs 106 in the wireless communication system 100 of FIG. 1.

FIG. 4 illustrates a plurality of beacon messages transmitted by the AP 104 to STAs 106 in the wireless communication system 100 of FIG. 1. The plurality of STAs 106 may use processors 204 running software to receive these beacon messages via the receiver 212 and to reorganize the transmitted information into its original form. These beacon messages may each comprise partial information distinct from one another. For example, as discussed in relation to FIG. 5B, one beacon message may comprise particular information regarding transmission power constraints. Another beacon message may comprise specific bandwidth information for a particular STA 106. These shorter beacon messages facilitate more efficient and more selective reception and decoding by the STAs 106. Thus, unlike the networks described above this arrangement will more efficiently convey information as STAs 106 may be more selective in how they acquire information. Accordingly, the STAs 106 need only listen to or decode the beacons messages of the plurality of beacon messages that include information (e.g., IEs) the STAs 106 require.

In certain aspects, the STAs 106 may poll the AP 104 for particular information using a shortened beacon message format. Using reciprocal "polling" messages and "wrapper" messages the STA 106 may be able to respond to a shortened beacon message and request specific characteristics regarding the AP 104, other STAs 106, or the network generally. Thus, certain aspects contemplate polling short beacon message forms by which an STA 106 may request more information, and a plurality of wrapper short beacons, which will respond with the desired information. This arrangement facilitates the STA 106's requesting further characteristics, individually, from the AP 104 (either the AP or STA) rather than being required to receive a large block of information in a single transmission.

The STA 106 may implement such polling using software running on processor 204 and memory 206 that directs the operation of transmitter 210 and receiver 212 as well as DSP 220. Similarly, the AP 104 may receive polling messages via receiver 212 and determine the appropriate wrapper message contents to transmit via transmitter 210 by software running on memory 206 and processor 204.

In certain aspects, these individual characteristics are referred to as information elements (IEs). Such characteristics may comprise the interval between beacon message transmissions, a supported data rate, power constraint information, bandwidth constraint information, possible network operations, etc. The STA 106 may request IE values because they were not included in the original shortened beacon message sent by the AP 104. The STA 106 may also request IE values at its own initiative. Furthermore, in certain aspects, the STA 106 may selectively request IE values separately from the AP 104, as part of a more granular request process. These aspects allow the STA 106 to control the delivery of IE values, rather than be dependent upon the AP 104.

In some aspects, the first beacon message in the series may be special in that it provides foundational information for when the STAs 106 may anticipate receiving supplemental beacon messages. Such information may comprise a relative position identifier, or index, indicating the timing when future beacon messages will arrive and what content they may possess. This information may be conveyed explicitly or implicitly, as described in greater detail below. By considering this information STAs 106 may decide to decode only a subset of the transmitted beacon messages and sleep the rest of the time.

In some aspects, a processor 204 running software on an STA 106 and a processor 204 running software on AP 104 may communicate via their respective transceivers 214 and agree which beacon messages will carry information of interest. STA 106 may subsequently only activate its transceiver 214 when those beacon messages are transmitted. In some aspects, information about the timing that particular beacon messages are transmitted (e.g., with respect to a repeated time interval such as transmission of a first beacon) and the information those beacons will include may be conveyed to each STA 106 and the AP 104 during initialization of the AP 104 and each STA 106 (e.g., at the time of manufacture of the STA 106 and the AP 104, at the first run time of the STA 106 and the AP 104, when an STA 106 join a new wireless network such as wireless communication system 100, etc.). In some aspects, the information may be conveyed or additionally revised, such as through communication with other devices in the wireless communication system 100. For example, the information may be exchanged between the AP 104 and the STA 106 during an association procedure, such as according to an 802.11 protocol (e.g., 802.11ah). In some aspects, the information may indicate a first beacon in a sequence carries information about network bandwidth. In some aspects, the information may indicate a second beacon in a sequence carries information about capabilities of the AP 104, such as a number of antennas the AP 104 includes.

The information may indicate, for example, the sequence in which beacon messages are transmitted. For example, information may be transmitted by the AP 104 in a sequence of beacon messages, each beacon message being separated by a time interval. The sequence may be, for example, beacon messages 1, 2, 3, 4, and 5. The AP 104 and STA 106 may have information about what type of information is included in each of beacon messages 1, 2, 3, 4, and 5. Accordingly, as long as the STA 106 has information about which beacon message is transmitted at which time, the STA 106 may listen to only beacon messages with information relevant to the STA 106. For example, if the STA 106 has information about when beacon message 1 is transmitted from the AP 104, the STA 106 may determine when the next beacon messages will be transmitted from the AP 104. In particular the STA 106 merely adds the interval time (or a multiple of the interval time as appropriate) between beacon messages to the timing of when beacon message 1 was transmitted to determine when the other beacon messages will be transmitted. Information about the timing of transmission of any of the beacon messages, not just beacon message 1, may be used to make determinations for when all beacon messages will be transmitted.

Each beacon message may comprise an identifier indicating that it is a beacon message as distinguished from a normal frame. Beacon messages may also include an identifier of the base station BSS so that an STA 106 may discard overlapping BSS (OBSS) beacon messages. Beacon messages may also communicate the MAC address of the AP 104.

Each beacon message may also comprise a relative position identifier in the form of a sequence number. These identifiers facilitate an STA's waking up to read an arbitrary beacon message and to synchronize with the remaining sequence. The sequence may comprise the number of beacon messages before the next first (or restart) beacon message. The next first (or restart) beacon message may itself comprise a special identifier identifying itself as such. Alternatively, if the total number of beacon messages in the sequence is known the last beacon message in the sequence may instead be used as a reference.

Certain aspects also contemplate indicating the time between two beacon messages. Alternatively, the time between beacon messages may be constant and expressed in multiples of microseconds. A list of Information elements may also be included, or just a list of those IEs which have changed since a prior transmission. Synch beacon messages, as described below, may have a PHY structure to allow them to be very short.

Figure 5A:
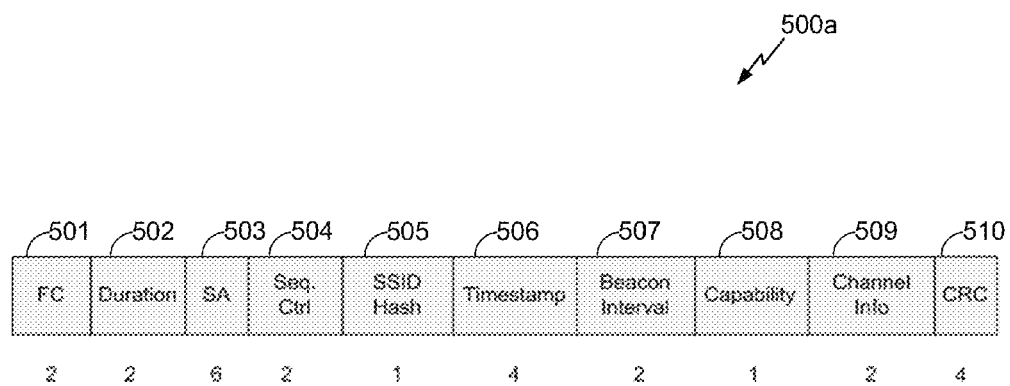
FIG. 5A illustrates an example of one form of a shortened beacon message that may be used in the wireless communication system of FIG. 1.

FIG. 5A illustrates an example of one form of a shortened beacon message that may be used in certain of the present aspects. The short beacon message 500a of this aspect may comprise ten components. The short beacon message 500a may comprise a frame control (FC) 501 comprising 2 bytes, a duration field 502 comprising 2 bytes, a source address (SA) field 503 comprising 6 bytes, a sequence control field 504 comprising 2 bytes and an SSID hash 505 comprising a single byte. The short beacon message 500a may also comprise a timestamp 506 comprising 4 bytes, a field indicating the beacon interval 507 comprising 2 bytes, and a capability field 508 comprising 1 byte, indicating the transmitter capabilities. The short beacon message 500a may also comprise an indication of the channel info 509 comprising 2 bytes and a CRC checksum 410 comprising 4 bytes.

The capability information field 508 may serve to provide information regarding a transmitting AP's wireless capabilities. In the illustrated aspect, the capability information field 508 is shorter than the capability information field 324 described above with respect to FIG. 3. Specifically, the capability information field 508 is only one byte long, whereas the capability information field 324 is two bytes long.

Figure 5B:
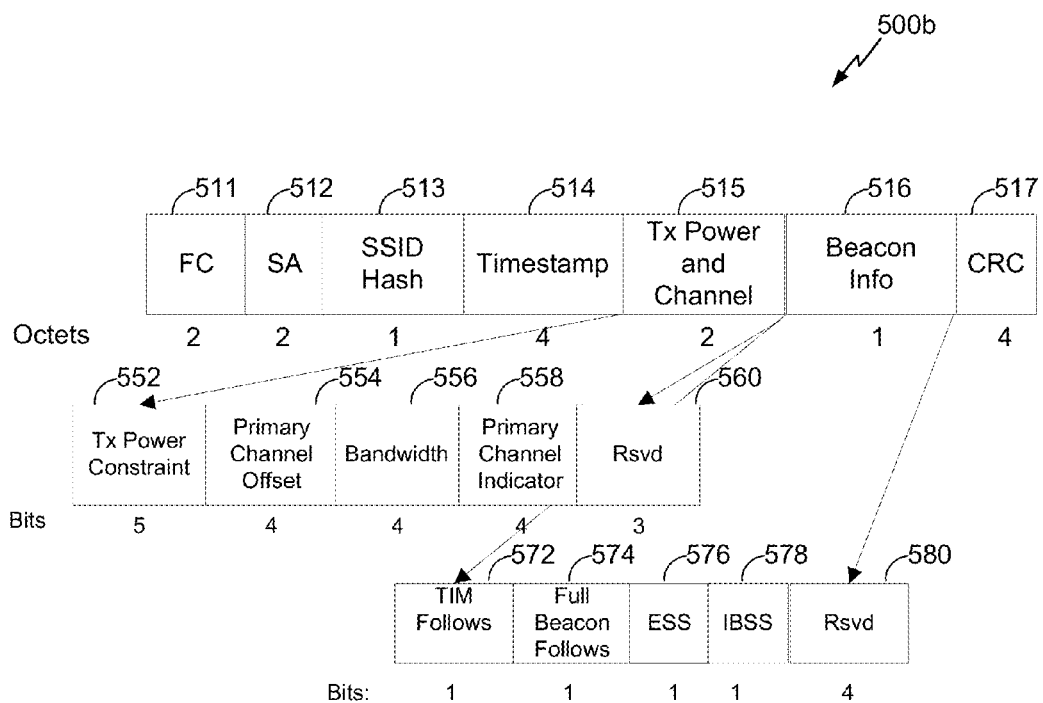
FIG. 5B illustrates another example of a beacon message that may be used in the wireless communication system of FIG. 1.

FIG. 5B illustrates another example of a beacon message format that may be used in the wireless communication system of FIG. 1. As indicated the transmit power channel may be broken down into more granular components. Similarly, the beacon information block may be decomposed into more granular components. This low overhead beacon 500b may comprise only 16 bytes.

As shown, the beacon 500b comprises a FC field 511 comprising 2 bytes (also referred to as octets), followed by a SA field 512 comprising 2 bytes, followed by a SSID hash field 513 comprising one byte, followed by a timestamp field 514 comprising 4 bytes, followed by a transmit power and channel field 515 comprising 2 bytes, followed by a beacon information field 516 comprising 1 byte, and followed by a cyclic redundancy check (CRC) field 517 comprising 4 bytes.

In describing the individual details of the transmit power and channel field 515, the transmit power and channel field 515 comprises a transmit power constraint field 552 comprising 5 bits, followed by a primary channel offset field 554 comprising 4 bits, followed by a bandwidth field 556 comprising 4 bits, followed by a primary channel indicator field 558 comprising 4 bits, and followed by a reserved field 560 comprising 3 bits.

In describing the individual details of the beacon information field 516, the beacon information field 516 comprises a traffic indication map (TIM) follows field 572 comprising 1 bit, followed by a full beacon follows field 574 comprising 1 bit, followed by an extended service set (ESS) field 576 comprising 1 bit, followed by an IBSS field 578 comprising 1 bit, and followed by a reserved field 580 comprising 4 bits.

In certain aspects this shortened beacon message may not be able to accommodate all the characteristic values of interest. Furthermore, as discussed above, it may be desirable for the STA 106 to selectively poll the AP 104 for certain characteristics of interest. In the example of FIG. 5B, the shortened beacon is providing information specifically regarding transmission power constraints at the AP 104. The STAs 106 who have an interest in this information may selectively request that information using a polling message as discussed above. In some aspects, the AP 104 may transmit this short beacon message periodically, and the STA 106 may instead receive the beacon message of FIG. 5B by synchronizing its reception with transmissions from the AP 104. In certain aspects, the STA 106 may synchronize its reception with transmissions from the AP 104 through the use of a synchronizing beacon transmitted by the AP 104. The synchronizing beacon may be a type of shortened beacon message and be transmitted according to the same methods as those discussed above with respect to shortened beacon messages in general. The STA 106 may further aggregate the information received over a number of periods in the periodically transmitted short beacon messages to obtain a complete network configuration information.

A synchronizing beacon may include one or more of the following, a hash of the BSSID serviced by the AP 104, and additional information to allow the STA 106 to determine the location in time a next beacon is to be transmitted from the AP 104. The hash of the BSSID allows the STA 106 to determine that the synchronizing beacon is from the AP 104 and not from some other AP that the STA 106 is not associated with. Accordingly, in some aspects, the STA 106 need only decode the synchronizing beacon if it contains the hash of the BSSID used by the AP 104. Further, the additional information allows the STA 106 to synchronize timing with the AP 104 for communicating. For example, the additional information may comprise an absolute time that a beacon is transmitted by the AP 104. The STA 106 may further have information about a time period between transmissions of beacons. Therefore, the STA 106 may synchronize with the absolute time sent in the beacon and selectively listen for subsequent beacons at repeating time intervals corresponding to the time period. The absolute time may be calculated from a reference time known by the STA 106 and the AP 104.

In another aspect, the additional information may comprise a relative time indication of the time offset from transmission of the synchronizing beacon to the transmission of a next beacon by the AP 104. For example, the STA 106 may have received an absolute time for synchronization in a first beacon. The STA 106 may then receive a subsequent beacon including a sequence number and a time offset (the time offset indicating a time offset between when the subsequent beacon was scheduled to be transmitted and when the subsequent beacon was actually transmitted due to, for example, contention). As discussed above, the STA 106 may further have information about a time period between transmissions of beacons. Based on the sequence number multiplied by the time period the STA 106 can determine when the subsequent beacon was scheduled to be transmitted. Further, by adding the time offset to the scheduled time, the STA 106 can determine when the subsequent beacon was actually transmitted. The STA 106 can then synchronize its time with the time the subsequent beacon was actually transmitted. Accordingly, the STA 106 may sleep until the transmission of the next beacon by the AP 104 at a time period after the synchronized time, then wakeup and receive the next beacon.

This time offset may be the same between successive beacon messages, allowing the STA 106 to know the transmission schedule of beacons generally. Further, as discussed above, the STA 106 may have information regarding the sequence in which beacon messages are transmitted, including when a synchronizing beacon is transmitted. Based on this information, as discussed above, the STA 106 may determine when different beacon messages with different information will be transmitted by the AP 104 and only listen for relevant beacon messages based on their offset from the synchronizing beacon. For example, the synchronizing beacon may be the $3^{rd}$ of 5 beacon messages transmitted in sequence by the AP 104. Therefore, the STA 106 may determine that the sequence will by transmitted by the AP 104 from the $3^{rd}$ beacon in the sequence at the time of receipt of the synchronizing beacon.

In another aspect, the additional information may comprise an index indicating the relative position of the synchronizing beacon in transmission of a sequence of beacon messages. Therefore, the STA 106 may determine that the sequence will be transmitted from the AP 104 from the index position indicated in the synchronizing beacon. Further, the STA 106 may assume the next beacon will be transmitted at a fixed time interval from receipt of the synchronizing beacon as discussed above.

In one aspect, the information discussed above for a synchronizing beacon may be sent in place of a service (SERVICE) field in a physical layer (PHY) preamble of a packet. In some aspects, the synchronizing beacon may be sent in a PHY layer preamble of a packet that consists only of a PHY header.

Figure 5C:
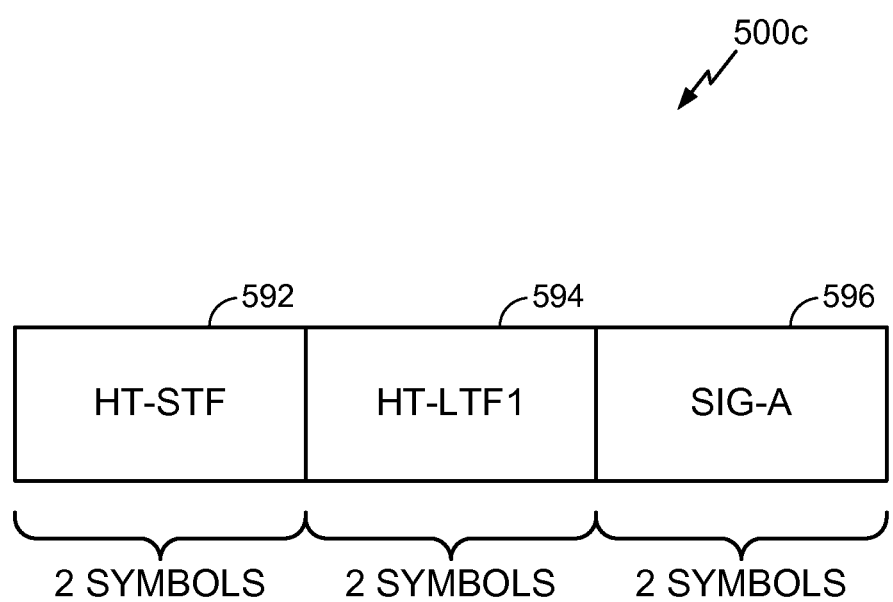
FIG. 5C illustrates an example of a physical layer (PHY) preamble including a synchronizing beacon that may be used in the wireless communication system of FIG. 1.

FIG. 5C illustrates an example of a PHY preamble 500c including a synchronizing beacon that may be used in the wireless communication system of FIG. 1. In certain aspects, the PHY preamble 500c includes a high throughput short training field (HT-STF) 592, followed by a high throughput long training field (HT-LTF1) 594, followed by a signal SIG-A, also referred to as SIG, field 596. Other embodiments need not be limited to high throughput as referred to in the previous sentence. As discussed herein, the information for a synchronizing beacon may be sent in the SIG-A field 596.

In another aspect, information discussed above for a synchronizing beacon may be sent in MAC data fields of a packet. In yet another aspect, the information discussed above for a synchronizing beacon may be sent in place of a signal (SIG) field in a physical layer preamble of a packet.

For example, the a normal SIG field of a physical layer preamble may be include the following information:

| Field of SIG A | Bits | Comments |
| --- | --- | --- |
| MCS | 4 | The modulation and coding scheme (MCS) for single user (SU) case, reserved for multi user (MU) |
| Num SS | 2 | Number of spatial streams for SU and Reserved for MU |
| SGI | 1 | Short Guard Interval |
| Length | 12 | Length field (in symbols when aggregation is ON, is in bytes when aggregation is OFF, Mandate AMPDU for packet sizes > 4095 bytes and for MU |
| Aggregation | 1 | Tells whether Aggregated MAC Protocol Data Unit (AMPDU) is being used or not for SU, reserved for MU |
| BW | 2 | Indicating bandwidth (BW) mode |
| Coding | 1 | Coding type for SU, reserved for MU |
| MU bit | 1 | Set to 1 for a MU transmission, zero otherwise |
| AID/'GID + Nsts' | 16 | Carries address identifier (AID) for all non-MU cases, Carries group identifier (GID) & number of stations (Nsts) for MU case |
| STBC | 1 | Space time block code |
| Reserved | 1 | |
| CRC | 4 | |
| Tail | 6 | |
| Total | 52 | |

For a synchronizing beacon, in one aspect, the SIG field of a physical layer preamble may be modified to include the following information:

| Field of SIG A | Bits | Comments |
| --- | --- | --- |
| MCS | 4 | The MCS for SU case, reserved for MU |
| Num SS | 2 | Number of spatial streams for SU and Reserved for MU |
| Beacon/NDP | 1 | Indicates if the frame is a synch beacon or neighbor discovery protocol (NDP) |
| Length | 12 | Set to all zeros |
| Relative position | 3 | Index of synch beacon with respect to corresponding main beacon |
| SSID Hash | 8 | Hash of SSID/BSSID |
| Offnet | 10 | Off net from the predicted time of this beacon in units of slots |
| Reserved | 2 | |
| CRC | 4 | |
| Tail | 6 | |
| Total | 52 | |

In some aspects, the length field may be set to all zeroes to indicate to the STA 106 that the SIG field is for a synchronizing beacon. Based on the length field being all zeroes, the STA 106 can determine that subsequent fields in the SIG field no longer serve the same function as in a normal SIG field. Rather the subsequent fields perform new functions. For example, the subsequent relative position field may indicate the sequence position of the synchronizing beacon with respect to the first beacon in a sequence of beacons. Further, the subsequent offset field may indicate the offset time at which the synchronizing beacon is transmitted with respect to the time the synchronizing beacon was expected to be transmitted in a time slot (assuming the AP 104 is off schedule). The STA 106 may utilize this information as discussed above to synchronize timing with the AP 104.

Figure 6:
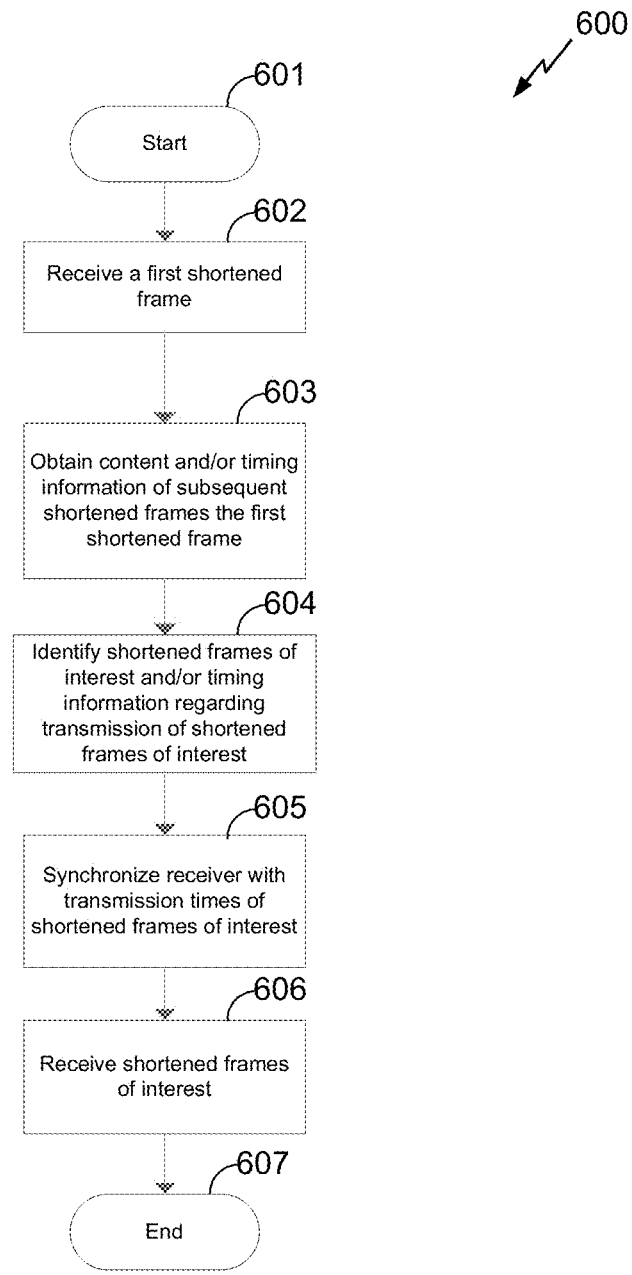
FIG. 6 illustrates a flow diagram depicting an exemplary process by which the wireless device of FIG. 2 acquires data frames.

FIG. 6 illustrates a flow diagram depicting an exemplary process by which the wireless device of FIG. 2 acquires data frames (e.g., shortened beacon messages). Initially, a wireless device such as the STA 106 may be in a doze state and then awakens to an awake state at a random or predetermined time. At 601 the process then starts. At 602, now awakened, the STA 106 receives a first shortened frame (e.g., a shortened beacon message) from the AP 104. The STA 106 may wait for a predetermined period in anticipation of receiving such a first shortened frame from the AP 104. If no frame arrives the STA 106 may return to the doze state until a subsequent attempt may be made.

At 603, the STA 106 may then obtain content information and/or timing information for a plurality of subsequent frames from the first shortened frame. Processor 204 running software may perform this role.

Utilizing the content information and/or timing information as discussed above, at 604 the STA 106 may then identify which of the plurality of subsequent shortened frames (e.g., shortened beacon messages) are of interest to the STA 106 and/or transmission times of such shortened frames of interest. At 605, the STA 106 may then synchronize the awake periods of transceiver 214 to coincide with the transmission times of the shortened frames of interest. In some aspects, the period between shortened frame transmissions by the AP 104 is known to the STA 106 beforehand. The STA 106 may accordingly synchronize reception by introducing an offset from the time the first shortened frame was received. This offset allows the awake times of the transceiver 214 of the STA 106 to coincide with the transmission times of the shortened frames of interest. In some aspects the timing information may instead comprise an absolute indication of the time offset until the beacon message. At 606, the STA 106 receives the shortened frames of interest. At 607 the process may end.

Figure 7:
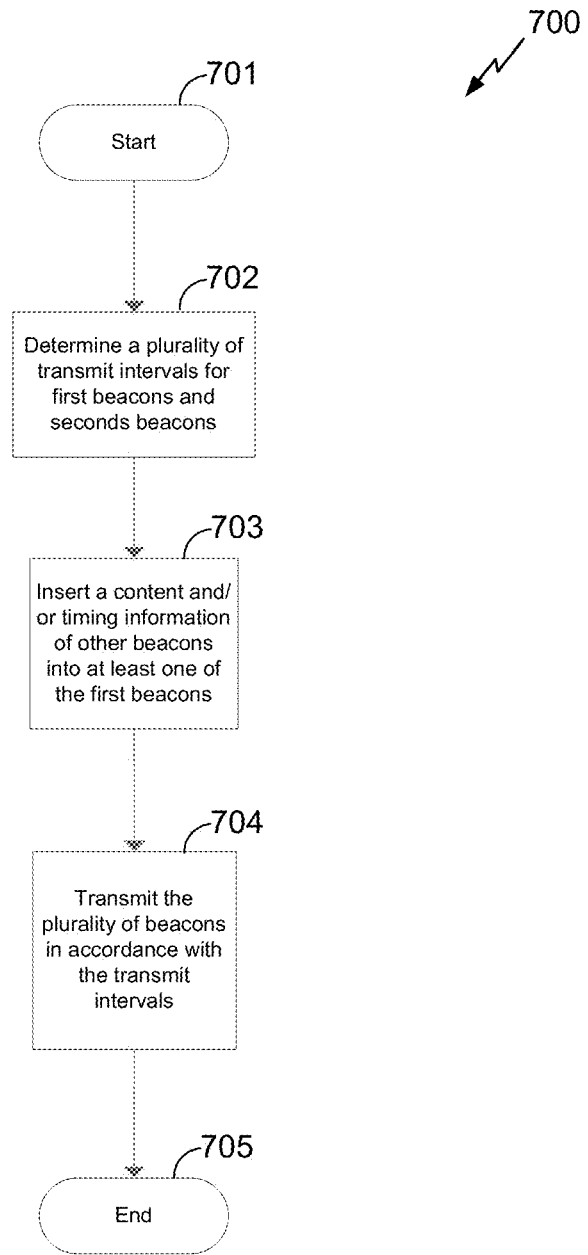
FIG. 7 illustrates a flow diagram depicting another exemplary process by which the wireless device of FIG. 2 generates and transmits data frames.

FIG. 7 illustrates a flow diagram depicting another exemplary process by which the wireless device of FIG. 2 generates and transmits data frames. Here, a wireless device such as the AP 104 may begin the process at 701. At 702, the AP 104 may determine a plurality of transmit intervals for a first beacon message type and a second beacon message type. In some aspects the first beacon message type comprises a synchronization beacon message type and the second beacon message type comprises a general beacon message type comprising information such as IEs.

At 703, the AP 104 may insert a timing information and/or content information about other beacon messages into at least one beacon message of the first beacon message type. This may comprise inserting a sequence number or similar identifier into a synchronization beacon message. An STA 106 awakening from a doze state may decode this beacon message and resynchronize with the remaining beacon messages transmitted by AP 104 as discussed herein.

At 704, the AP 104 may transmit the plurality of beacon messages in accordance with the determined transmit intervals, using, for example the transceiver 214. At 705 the process may end.

Figure 8:
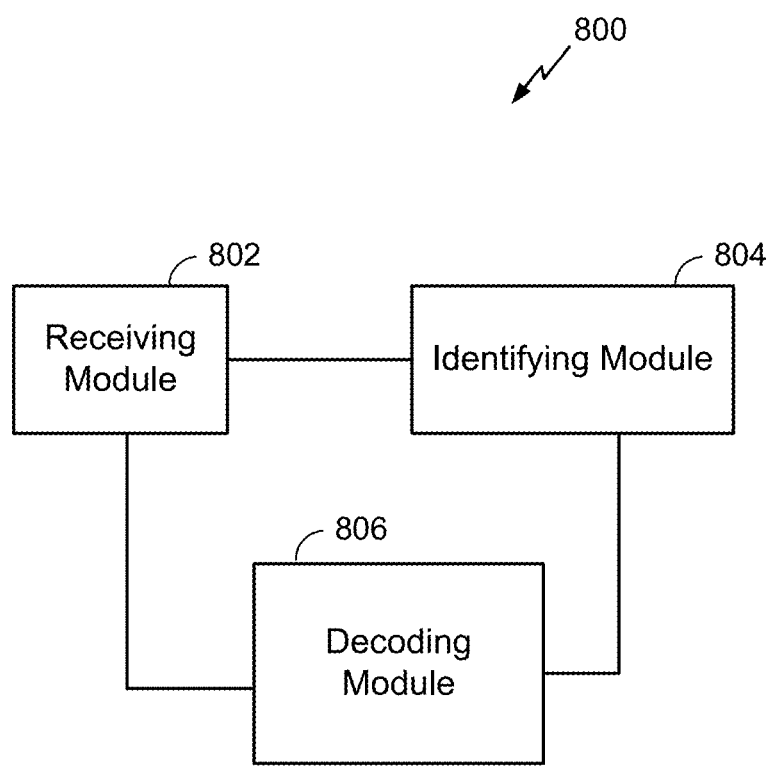
FIG. 8 is a functional block diagram of another exemplary wireless device that may be employed within the wireless communication system of FIG. 1.

FIG. 8 is a functional block diagram of another exemplary wireless device 800 that may be employed within the wireless communication system 100 of FIG. 1. The device 800 comprises a receiving module 802 for receiving beacon messages from devices such as the AP 104. The receiving module 802 may be configured to perform one or more of the functions discussed above with respect to blocks 602 and 606 of FIG. 6. The receiving module 802 may correspond to the receiver 212. The device 800 further comprises an identifying module 804 for identifying transmission time of beacon messages from a frame such as a synchronization beacon. The identifying module 804 may be configured to perform one or more of the functions discussed above with respect to blocks 604 and 605 of FIG. 6. The identifying module 804 may correspond to one or more of the processor 204 and the DSP 220. The device 800 further comprises a decoding module 806 for decoding beacon messages as discussed above. The decoding module 806 may correspond to one or more of the processor 204 and the DSP 220.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating beacon messages in a base station subsystem comprising an access point and an access terminal, the method comprising:
   transmitting, from the access point to the access terminal, a repeating finite sequence of beacon messages, the sequence comprising a first beacon message comprising a relative position identifier to indicate timing of subsequent beacon messages in the finite sequence and to identify content included in the subsequent beacon messages, wherein the subsequent beacon messages include information not included in the first beacon message;
   transmitting, from the access point to the access terminal, a time offset, an absolute time, and a sequence number to enable the access terminal to transition from a low power state to a high power state at a time determined from the time offset, the absolute time, and the sequence number; and
   decoding, at the access terminal, the first beacon message and a proper subset of the sequence of beacon messages based upon the relative position identifier, wherein the access terminal is in a low power state during transmission of a second subset of sequence of beacon messages, and the second subset of beacon messages comprises beacon messages not in the proper subset and does not include the first beacon message.

2. The method of claim 1, wherein the first beacon message includes information comprising network bandwidth for the base station subsystem.

3. The method of claim 1, wherein the first beacon message includes information indicating a second beacon message in the sequence has information comprising capabilities of the access point.

4. The method of claim 3, wherein the capabilities includes a number of antennas of the access point.

5. The method of claim 1, wherein the first beacon message includes a full beacon follows field indicating if the access point transmits a full beacon message immediately following in sequence the first beacon message.

6. The method of claim 1, further comprising:
   decoding, by the access terminal, a second beacon message providing the absolute time; and
   decoding, by the access terminal, a third beacon message subsequent to the second beacon message, wherein the third beacon message comprises the sequence number relative to the first beacon message and the time offset, and the time offset indicates a time difference between when the third beacon message was scheduled to be transmitted by the access point and when the third beacon message was transmitted.

7. The method of claim 6, wherein the second beacon message comprises a physical layer preamble having a length field comprised of all zeros.

8. The method of claim 1, wherein the repeating sequence of beacon messages has a short beacon interval and a beacon interval that is an integer multiple of the short beacon interval.

9. The method of claim 1, wherein the base system substation has a Basic Service Set Identification (BSSID), and the first beacon message has information comprising a compressed value of the BSSID.

10. The method of claim 9, wherein the compressed BSSID value is a cyclic redundancy check of the BSSID.

11. The method of claim 1, wherein the first beacon message has a four-byte timestamp comprised of the four least significant bytes of the access point timestamp.

12. The method of claim 1, wherein the first beacon message comprises a one byte change sequence field, and the method further comprises increasing, by the access point, the value of the change sequence field to indicate a change in network information.

13. The method of claim 1, wherein the first beacon message comprises a frame control field including a three-bit bandwidth field.

14. A method of communicating in a base station subsystem comprising an access point and an access terminal, wherein the base station subsystem is identified by a Basic Service Set Identification (BSSID), the method comprising:
- transmitting beacon messages from the access point to the access terminal, wherein each beacon message is an instance of a full beacon message type or an instance of a short beacon message type;
- transmitting, from the access point to the access terminal, a time offset, an absolute time, and a sequence number to enable the access terminal to transition from a low power state to a high power state at a time determined from the time offset, the absolute time, and the sequence number;
- transmitting beacon messages of the short beacon message type at a first time interval; and
- transmitting full beacon messages of the full beacon message type at a second time interval equal to an integer multiple of the first time interval,
- wherein each beacon message of the short beacon message type includes a compressed BSSID field having a value indicative of a cyclic redundancy check of the BSSID.

15. The method of claim 14, wherein the access point provides a timestamp, and each beacon message of the short beacon message type includes a four-byte timestamp comprised of the four least significant bytes of the access point timestamp.

16. The method of claim 14, wherein each beacon message of the short beacon message type includes a one-byte change sequence field having a value, and the method further comprises:
- incrementing the value of the change sequence field in the beacon message of the short beacon message type to indicate a change in information regarding the base station subsystem.

17. The method of claim 14, wherein each beacon message of the short beacon message type includes a full beacon follows field indicating if an immediately subsequent beacon message is of the full beacon message type.

18. The method of claim 17, wherein the access point provides a timestamp, and the time of a next beacon message indicated in the full beacon follows field is the higher three bytes of the four least significant bytes of the value of the timestamp when the next beacon message of the full beacon message type is scheduled for transmission.

19. The method of claim 14, wherein each beacon message of the short beacon message type includes a frame control field including a three-bit bandwidth field.

20. A method of communicating beacon messages in a base station subsystem comprising an access point and an access terminal, the method comprising:
- decoding, by the access terminal, a first beacon message providing an absolute time;
- decoding, by the access terminal, a second beacon message subsequent to the first beacon message, wherein the second beacon message comprises a sequence number relative to the first beacon message and a time offset indicating a time difference between when the second beacon message was scheduled to be transmitted by the access point and when the second beacon message actually was transmitted; and
- transitioning the access terminal from a low power state to a high power state at a time determined from the time offset, the absolute time, and the sequence number.

21. A method of communicating a set of information elements in a base station subsystem comprising an access point and an access terminal, the method comprising:
- transmitting beacon messages from the access point to the access terminal, wherein each beacon message is an instance of a full beacon message type or an instance of a short beacon message type, and each beacon message of the full beacon message type comprises the set of information elements;
- transmitting a plurality of beacon messages of the short beacon message type, wherein each beacon message in the plurality of beacon messages comprises a proper subset of the set of information elements, and the plurality of beacon messages comprises the set of information elements; and
- transmitting a time offset, an absolute time, and a sequence number to the access terminal to enable the access terminal to transition from a low power state to a high power state at a time determined from the time offset, the absolute time, and the sequence number.

22. The method of claim 21, wherein the set of information elements comprise network information about the base station subsystem.

23. A method of communicating in a base station subsystem comprising an access point and an access terminal, the method comprising:
- transmitting beacon messages from the access point to the access terminal, wherein each beacon message is an instance of a full beacon message type or an instance of a short beacon message type;
- transmitting a first beacon message comprising content information specifying information included in beacon messages of the short beacon message type transmitted subsequently to the first beacon message; and
- transmitting a time offset, an absolute time, and a sequence number to the access terminal to enable the access terminal to transition from a low power state to a high power state at a time determined from the time offset, the absolute time, and the sequence number.

24. The method of claim 23, further comprising:
- transmitting a plurality of beacon messages of the short beacon message type subsequent to the first beacon message, wherein each beacon message in the plurality of beacon messages comprises information according to the content information; and
- changing, based upon the content information, a power state of the access terminal into the low power state for a portion of the plurality of beacon messages of the short beacon message type.

25. The method of claim 23, wherein the first beacon message is of the short beacon message type.

26. A method of communicating in a base station subsystem comprising an access point and an access terminal, the method comprising:
- transmitting beacon messages from the access point to the access terminal, wherein each beacon message is an instance of a full beacon message type or an instance of a short beacon message type;
- transmitting a plurality of beacon messages of the short beacon message type, wherein each beacon message in the plurality of beacon messages comprises a physical layer preamble comprising a signal field including a length field; and
- decoding, at the access terminal, the plurality of beacon messages as synchronization beacon messages, provided the length field of the beacon messages is set to all zeroes.

27. The method of claim 26, wherein each beacon message decoded as a synchronization beacon message comprises a subsequent relative position field indicating the sequence position of the synchronizing beacon with respect to the first beacon message in a sequence of beacon messages.

28. The method of claim 27, wherein each beacon message decoded as a synchronization beacon message comprises a subsequent offset field indicating the offset time at which the synchronizing beacon is transmitted with respect to the time the synchronizing beacon was expected to be transmitted.

29. A system for communicating beacon messages in a base station subsystem comprising an access point and an access terminal, the system comprising:
the access point comprising a transmitter configured to transmit a repeating finite sequence of beacon messages, wherein the sequence comprises a first beacon message including a relative position identifier indicating timing of subsequent beacon messages in the finite sequence and configured to identify content included in the subsequent beacon messages, and the subsequent beacon messages include information not included in the first beacon message; and
the access terminal comprising:
a decoding module configured to decode, based upon the relative position identifier, the first beacon message and a proper subset of the sequence of beacon messages; and
a processor configured to change a state of the access terminal to a low power state when the transmitter of the access point transmits a second subset of sequence of beacon messages, wherein the second subset of beacon messages comprises beacon messages not in the proper subset and does not include the first beacon message, and are configured to transition the access terminal from the low power state to a high power state at a time determined from a time offset, an absolute time, and a sequence number.

30. The system of claim 29, wherein the first beacon message includes information comprising network bandwidth for the base station subsystem.

31. The system of claim 29, wherein the first beacon message includes information indicating a second beacon message in the sequence has information comprising capabilities of the access point.

32. The system of claim 31, wherein the capabilities include a number of antennas of the access point.

33. The system of claim 29, wherein the first beacon message includes a full beacon follows field indicating if the access point transmits a full beacon message immediately following the first beacon message.

34. The system of claim 29, wherein the decoding module is configured to:
decode a second beacon message providing the absolute time; and
decode a third beacon message subsequent to the second beacon message, wherein the third beacon message comprises the sequence number relative to the first beacon message and the time offset, and the time offset indicates a time difference between when the third beacon message was scheduled to be transmitted by the access point and when the third beacon message was transmitted.

35. The system of claim 34, wherein the second beacon message comprises a physical layer preamble having a length field comprised of all zeros.

36. The system of claim 29, wherein the repeating sequence of beacon messages has a short beacon interval and a beacon interval that is an integer multiple of the short beacon interval.

37. The system of claim 29, comprising a base system substation comprising the access point and having a Basic Service Set Identification (BSSID), wherein the first beacon message includes information comprising a compressed value of the BSSID.

38. The system of claim 37, wherein the compressed BSSID value is a cyclic redundancy check of the BSSID.

39. The system of claim 29, wherein the first beacon message has a four-byte timestamp comprised of the four least significant bytes of the access point timestamp.

40. The system of claim 29, wherein the first beacon message comprises a one byte change sequence field, and the access point is configured to increase the value of the change sequence field to indicate a change in network information.

41. The system of claim 29, wherein the first beacon message comprises a frame control field including a three-bit bandwidth field.

42. An access point identified by a Basic Service Set Identification (BSSID), the access point comprising:
a transmitter configured to transmit beacon messages, wherein:
each beacon message is an instance of a full beacon message type or an instance of a short beacon message type;
the transmitter is configured to:
transmit beacon messages of the short beacon message type at a first time interval,
transmit full beacon messages of the full beacon message type at a second time interval, the second time interval equal to an integer multiple of the first time interval, and
transmit a time offset, an absolute time, and a sequence number to the access terminal to enable the access terminal to transition from a low power state to a high power state at a time determined from the time offset, the absolute time, and the sequence number; and
each beacon message of the short beacon message type includes a compressed BSSID field having a value indicative of a cyclic redundancy check of the BSSID.

43. The access point of claim 42, wherein the access point is configure to provide a timestamp, and each beacon message of the short beacon message type includes a four-byte timestamp comprised of the four least significant bytes of the access point timestamp.

44. The access point of claim 42, wherein each beacon message of the short beacon message type includes a one-byte change sequence field having a value, and the access point is configured to increment the value of the change sequence field in a beacon message of the short beacon message type indicating a change in information regarding the base station subsystem.

45. The access point of claim 42, wherein each beacon message of the short beacon message type includes a full beacon follows field indicating if an immediately subsequent beacon message is of the full beacon message type.

46. The access point of claim 45, wherein the access point is configured to provide a timestamp, and the time of a next beacon message indicated in the full beacon follows field is the higher three bytes of the four least significant bytes of the value of the timestamp when the next beacon message of the full beacon message type is scheduled for transmission.

47. The access point of claim 42, wherein each beacon message of the short beacon message type includes a frame control field including a three-bit bandwidth field.

48. An access terminal configured to receive beacon messages in a base station subsystem, the access terminal comprising:
a decoding module configured to:
decode a first beacon message providing an absolute time;
decode a second beacon message subsequent to the first beacon message, wherein the second beacon message comprises a sequence number relative to the first beacon message and a time offset, and the time offset indicates a time difference between when the second beacon message was scheduled to be transmitted and when the second beacon message actually was transmitted; and
transition the access terminal from a low power state to a high power state at a time determined from the time offset, the absolute time, and the sequence number.

49. An access point configured to communicate a set of information elements in a base station subsystem, the access point comprising:
a transmitter configured to:
transmit beacon messages, wherein each beacon message is an instance of a full beacon message type or an instance of a short beacon message type, and each beacon message of the full beacon message type comprises the set of information elements;
transmit a plurality of beacon messages of the short beacon message type, wherein each beacon message in the plurality of beacon messages comprises a proper subset of the set of information elements, and the plurality of beacon messages comprises the set of information elements; and
transmit a time offset, an absolute time, and a sequence number to the access terminal to enable the access terminal to transition from a low power state to a high power state at a time determined from the time offset, the absolute time, and the sequence number.

50. The access point of claim 49, wherein the set of information elements comprise network information about the base station subsystem.

51. A system comprising an access point, the access point comprising a transmitter configured to:
transmit beacon messages, wherein each beacon message is an instance of a full beacon message type or an instance of a short beacon message type;
transmit a first beacon message comprising content information specifying information included in beacon messages of the short beacon message type transmitted subsequently to the first beacon message; and
transmit a time offset, an absolute time, and a sequence number to the access terminal to enable the access terminal to transition from a low power state to a high power state at a time determined from the time offset, the absolute time, and the sequence number.

52. The system of claim 51, wherein:
the transmitter is further configured to transmit a plurality of beacon messages of the short beacon message type subsequent to the first beacon message;
each beacon message in the plurality of beacon messages comprises information according to the content information; and
the system further comprises an access terminal comprising a processor configured to change, based upon the content information, a power state of the access terminal into the low power state for a portion of the plurality of beacon messages of the short beacon message type.

53. The system of claim 51, wherein the first beacon message is of the short beacon message type.

54. An access terminal configured to receive beacon messages for a base station subsystem, wherein each beacon message is an instance of a full beacon message type or an instance of a short beacon message type, the access terminal comprising:
a receiver configured to receive a plurality of beacon messages of the short beacon message type, wherein each beacon message in the plurality of beacon messages comprises a physical layer preamble comprising a signal field comprising a length field; and
a decoding module configured to decode the plurality of beacon messages, wherein the beacon messages in the plurality of beacon messages are decoded as synchronization beacon messages, provided the length field of the beacon messages is set to all zeroes.

55. The access terminal of claim 54, wherein each beacon message decoded as a synchronization beacon messages comprises a subsequent relative position field indicating the sequence position of the synchronizing beacon with respect to the first beacon message in a sequence of beacon messages.

56. The access terminal of claim 55, wherein each beacon message decoded as a synchronization beacon message comprises a subsequent offset field indicating the offset time at which the synchronizing beacon is transmitted with respect to the time the synchronizing beacon was expected to be transmitted.

57. A system for communicating beacon messages in a base station subsystem comprising an access point and an access terminal, the system comprising:
the access point comprising a means for transmitting that is configured to:
transmit a repeating finite sequence of beacon messages, wherein the sequence a first beacon message comprising a relative position identifier to indicate timing of subsequent beacon messages in the finite sequence,
identify content included in the subsequent beacon messages, wherein the subsequent beacon messages includes information not included in the first beacon message, and
transmit a time offset, an absolute time, and a sequence number to an access terminal to enable the access terminal to transition from a low power state to a high power state at a time determined from the time offset, the absolute time, and the sequence number,
wherein the access terminal comprises:
a means for decoding configured to decode the first beacon message and a proper subset of the sequence of beacon messages based upon the relative position identifier; and
a means for processing configured to change the state of the access terminal to a low power state when the means for transmitting of the access point transmits a second subset of sequence of beacon messages, wherein the second subset of beacon messages comprises beacon messages not in the proper subset and does not include the first beacon message.

58. The system of claim 57, wherein the first beacon message includes information comprising network bandwidth for the base station subsystem.

59. The system of claim 57, wherein the first beacon message includes information indicating a second beacon message in the sequence has information comprising capabilities of the access point.

60. The system of claim 59, wherein the capabilities include the number of antennas of the access point.

61. The system of claim 57, wherein the first beacon message includes a full beacon follows field indicating if the access point transmits a full beacon message immediately following in sequence the first beacon message.

62. The system of claim 57, wherein the means for decoding is configured to:
   decode a second beacon message providing the absolute time; and
   decode a third beacon message subsequent to the second beacon message, wherein the third beacon message comprises the sequence number relative to the first beacon message and the time offset, and the time offset indicates a time difference between when the third beacon message was scheduled to be transmitted by the access point and when the third beacon message was transmitted.

63. The system of claim 62, wherein the second beacon message comprises a physical layer preamble having a length field comprised of all zeros.

64. The system of claim 57, wherein the repeating sequence of beacon messages has a short beacon interval and a beacon interval, and the beacon interval is an integer multiple of the short beacon interval.

65. The system of claim 57, further comprising a base system substation including the access point and having a Basic Service Set Identification (BSSID), wherein the first beacon message includes information comprising a compressed value of the BSSID.

66. The system of claim 65, wherein the compressed BSSID value is a cyclic redundancy check of the BSSID.

67. The system of claim 57, wherein the first beacon message includes a four-byte timestamp comprised of the four least significant bytes of the access point timestamp.

68. The system of claim 57, wherein first beacon message comprises a one byte change sequence field, and the access point is configured to increase the value of the change sequence field to indicate a change in network information.

69. The system of claim 57, wherein the first beacon message a frame control field including a three-bit bandwidth field.

70. An access point identified by a Basic Service Set Identification (BSSID), the access point comprising:
   a means for transmitting beacon messages, wherein each beacon message is an instance of a full beacon message type or an instance of a short beacon message type, and the means for transmitting is configured to transmit beacon messages of the short beacon message type at a first time interval;
   a means for transmitting full beacon messages of the full beacon message type at a second time interval equal to an integer multiple of the first time interval;
   wherein each beacon message of the short beacon message type includes a compressed BSSID field having a value indicating a cyclic redundancy check of the BSSID; and
   a means for transmitting a time offset, an absolute time, and a sequence number to an access terminal to enable the access terminal to transition from a low power state to a high power state at a time determined from the time offset, the absolute time, and the sequence number.

71. The access point of claim 70, wherein the access point is configured to provide a timestamp, and each beacon message of the short beacon message type includes a four-byte timestamp comprised of the four least significant bytes of the access point timestamp.

72. The access point of claim 70, wherein each beacon message of the short beacon message type includes a one-byte change sequence field having a value, and the access point is configured to increment the value of the change sequence field in a beacon message of the short beacon message type to indicate a change in information regarding the base station subsystem.

73. The access point of claim 70, wherein each beacon message of the short beacon message type includes a full beacon follows field indicating if an immediately subsequent beacon message is of the full beacon message type.

74. The access point of claim 73, wherein the access point is configured to provide a timestamp, and the time of a next beacon message indicated in the full beacon follows field is the higher three bytes of the four least significant bytes of the value of the timestamp when the next beacon message of the full beacon message type is scheduled for transmission.

75. The access point of claim 70, wherein each beacon message of the short beacon message type includes a frame control field including a three-bit bandwidth field.

76. An access terminal to receive beacon messages in a base station subsystem, the access terminal comprising:
   a means for decoding configured to:
      decode a first beacon message providing an absolute time,
      decode a second beacon message subsequent to the first beacon message, wherein the second beacon message comprises a sequence number relative to the first beacon message and a time offset, and the time offset indicates a time difference between when the second beacon message was scheduled to be transmitted and when the second beacon message was transmitted; and
   means for transitioning the access terminal from a low power state to a high power state at a time determined from the time offset, the absolute time, and the sequence number.

77. An access point to communicate a set of information elements in a base station subsystem, the access point comprising:
   a means for transmitting beacon messages, wherein each beacon message is an instance of a full beacon message type or an instance of a short beacon message type, and each beacon message of the full beacon message type comprises the set of information elements;
   a means for transmitting a plurality of beacon messages of the short beacon message type, wherein each beacon message in the plurality of beacon messages comprising a proper subset of the set of information elements, and the plurality of beacon messages comprises the set of information elements; and
   a means for transmitting a time offset, an absolute time, and a sequence number to the access terminal to enable the access terminal to transition from a low power state to a high power state at a time determined from the time offset, the absolute time, and the sequence number.

78. The access point of claim 77, wherein the set of information elements comprise network information about the base station subsystem.

79. A system comprising an access point, the access point comprising:
   a means for transmitting beacon messages, wherein each beacon message is an instance of a full beacon message type or an instance of a short beacon message type;
   a means for transmitting a first beacon message comprising content information specifying information included in beacon messages of the short beacon message type transmitted subsequently to the first beacon message; and a means for transmitting a time offset, an absolute time, and a sequence number to the access terminal to enable the access terminal to transition from a low power state to a high power state at a time determined from the time offset, the absolute time, and the sequence number.

80. The system of claim 79, wherein the means for transmitting beacon messages is configured to transmit beacon messages of the short beacon message type subsequent to the first beacon message, wherein each beacon message in the plurality of beacon messages comprises information according to the content information; and the system further comprises an access terminal comprising a means for changing, based upon the content information, a power state of the access terminal into the low power state for a portion of the plurality of beacon messages of the short beacon message type.

81. The system of claim 79, wherein the first beacon message is of the short beacon message type.

82. An access terminal configured to receive beacon messages for a base station subsystem, based upon the content information each beacon message is an instance of a full beacon message type or an instance of a short beacon message type, the access terminal comprising:

a means for receiving a plurality of beacon messages of the short beacon message type, wherein each beacon message in the plurality of beacon messages comprising a physical layer preamble comprising a signal field including a length field; and a means for decoding the plurality of beacon messages, wherein the beacon messages in the plurality of beacon messages are decoded as synchronization beacon messages, provided the length field of the beacon messages is set to all zeroes.

83. The access terminal of claim 82, wherein each beacon message decoded as a synchronization beacon messages comprises a subsequent relative position field indicating the sequence position of the synchronizing beacon with respect to the first beacon message in a sequence of beacon messages.

84. The access terminal of claim 83, wherein each beacon message decoded as a synchronization beacon message comprises a subsequent offset field indicating the offset time at which the synchronizing beacon is transmitted with respect to the time the synchronizing beacon was expected to be transmitted.

85. A non-transitory computer readable storage medium comprising processor-executable instructions stored thereon configured to cause a processor to execute a method for communicating beacon messages in a base station subsystem comprising an access point and an access terminal, the method comprising:

transmitting, from the access point to the access terminal, a repeating finite sequence of beacon messages, wherein the sequence comprises a first beacon message comprising a relative position identifier indicating timing of subsequent beacon messages in the finite sequence and identifying content included in the subsequent beacon messages, and the subsequent beacon messages include information not included in the first beacon message;

transmitting, from the access point to the access terminal, a time offset, an absolute time, and a sequence number to enable the access terminal to transition from a low power state to a high power state at a time determined from the time offset, the absolute time, and the sequence number; and decoding, at the access terminal, the first beacon message and a proper subset of the sequence of beacon messages based upon the relative position identifier, wherein the access terminal is in a low power state during transmission of a second subset of sequence of beacon messages, and the second subset of beacon messages comprises beacon messages not in the proper subset and does not include the first beacon message.

86. The non-transitory computer readable storage medium of claim 85, wherein the first beacon message includes information comprising network bandwidth for the base station subsystem.

87. The non-transitory computer readable storage medium of claim 85, wherein the first beacon message includes information indicating a second beacon message in the sequence has information comprising capabilities of the access point.

88. The non-transitory computer readable storage medium of claim 87, wherein the capabilities includes the number of antennas of the access point.

89. The non-transitory computer readable storage medium of claim 85, wherein the first beacon message includes a full beacon follows field indicating if the access point transmits a full beacon message immediately following in sequence the first beacon message.

90. The non-transitory computer readable storage medium of claim 85, the method further comprising:

decoding, by the access terminal, a second beacon message providing the absolute time; and decoding, by the access terminal, a third beacon message subsequent to the second beacon message, wherein the third beacon message comprises the sequence number relative to the first beacon message and the time offset, and the time offset indicates a time difference between when the third beacon message was scheduled to be transmitted by the access point and when the third beacon message was transmitted.

91. The non-transitory computer readable storage medium of claim 90, wherein the second beacon message comprises a physical layer preamble having a length field comprised of all zeros.

92. The non-transitory computer readable storage medium of claim 85, wherein the repeating sequence of beacon messages has a short beacon interval and a beacon interval that is an integer multiple of the short beacon interval.

93. The non-transitory computer readable storage medium of claim 85, wherein the base system substation has a Basic Service Set Identification (BSSID), and the first beacon message has information comprising a compressed value of the BSSID.

94. The non-transitory computer readable storage medium of claim 93, wherein the compressed BSSID value is a cyclic redundancy check of the BSSID.

95. The non-transitory computer readable storage medium of claim 85, wherein the first beacon message has a four-byte timestamp comprised of the four least significant bytes of the access point timestamp.

96. The non-transitory computer readable storage medium of claim 85, wherein the first beacon message comprises a one byte change sequence field, and the method further comprises increasing the value of the change sequence field to indicate a change in network information.

97. The non-transitory computer readable storage medium of claim 85, wherein the first beacon message comprises a frame control field, and the frame control field includes a three-bit bandwidth field.

98. A non-transitory computer readable storage medium comprising processor-executable instructions stored thereon configured to cause a processor to execute a method for communicating beacon messages in a base station subsystem comprising an access point and an access terminal, wherein the base station subsystem is identified by a Basic Service Set Identification (BSSID), the method comprising:

transmitting beacon messages from the access point to the access terminal, wherein each beacon message is an instance of a full beacon message type or an instance of a short beacon message type;

transmitting, from the access point to the access terminal, a time offset, an absolute time, and a sequence number to enable the access terminal to transition from a low power state to a high power state at a time determined from the time offset, the absolute time, and the sequence number; and transmitting beacon messages of the short beacon message type at a first time interval, and transmitting full beacon messages of the full beacon message type at a second time interval, wherein the second time interval is equal to an integer multiple of the first time interval, and each beacon message of the short beacon message type includes a compressed BSSID field having a value indicative of a cyclic redundancy check of the BSSID.

99. The non-transitory computer readable storage medium of claim 98, wherein each beacon message of the short beacon message type includes a four-byte timestamp comprised of the four least significant bytes of the access point timestamp.

100. The non-transitory computer readable storage medium of claim 98, wherein each beacon message of the short beacon message type includes a one-byte change sequence field having a value, and the method further comprises incrementing the value of the change sequence field in a beacon message of the short beacon message type to indicate a change in information regarding the base station subsystem.

101. The non-transitory computer readable storage medium of claim 98, wherein each beacon message of the short beacon message type includes a full beacon follows field indicating if an immediately subsequent beacon message is of the full beacon message type.

102. The non-transitory computer readable storage medium of claim 101, wherein the access point provides a timestamp, and the time of a next beacon message indicated in the full beacon follows field is the higher three bytes of the four least significant bytes of the value of the timestamp when the next beacon message of the full beacon message type is scheduled for transmission.

103. The non-transitory computer readable storage medium of claim 98, wherein each beacon message of the short beacon message type includes a frame control field including a three-bit bandwidth field.

104. A non-transitory computer readable storage medium comprising processor-executable instructions stored thereon configured to cause a processor to execute a method for communicating beacon messages in a base station subsystem comprising an access point and an access terminal, the method comprising:

decoding, by the access terminal, a first beacon message providing an absolute time;

decoding, by the access terminal, a second beacon message subsequent to the first beacon message, wherein the second beacon message comprises a sequence number relative to the first beacon message and a time offset, and the time offset indicates a time difference between when the second beacon message was scheduled to be transmitted by the access point and when the second beacon message was transmitted; and transitioning the access terminal from a low power state to a high power state at a time determined from the time offset, the absolute time, and the sequence number.

105. A non-transitory computer readable storage medium having instructions stored thereon to perform a method when executed by at least one processor, the method for communicating a set of information elements in a base station subsystem comprising an access point and an access terminal, the method comprising:

transmitting beacon messages from the access point to the access terminal, wherein each beacon message is an instance of a full beacon message type or an instance of a short beacon message type, wherein each beacon message of the full beacon message type comprises the set of information elements;

transmitting a plurality of beacon messages of the short beacon message type, wherein each beacon message in the plurality of beacon messages comprises a proper subset of the set of information elements, and the plurality of beacon messages comprises the set of information elements; and transmitting a time offset, an absolute time, and a sequence number to the access terminal to enable the access terminal to transition from a low power state to a high power state at a time determined from the time offset, the absolute time, and the sequence number.

106. The non-transitory computer readable storage medium of claim 105, wherein the set of information elements comprises network information about the base station subsystem.

107. A non-transitory computer readable storage medium comprising processor-executable instructions stored thereon configured to cause a processor to execute a method for communicating beacon messages in a base station subsystem comprising an access point and an access terminal, the method comprising:

transmitting beacon messages from the access point to the access terminal, wherein each beacon message is an instance of a full beacon message type or an instance of a short beacon message type;

transmitting a first beacon message comprising content information specifying information included in beacon messages of the short beacon message type transmitted subsequently to the first beacon message; and transmitting a time offset, an absolute time, and a sequence number to the access terminal to enable the access terminal to transition from a low power state to a high power state at a time determined from the time offset, the absolute time, and the sequence number.

108. The non-transitory computer readable storage medium of claim 107, the method further comprising:

transmitting a plurality of beacon messages of the short beacon message type subsequent to the first beacon message, wherein each beacon message in the plurality of beacon messages comprises information according to the content information; and changing, based upon the content information, a power state of the access terminal into the low power state for a portion of the plurality of beacon messages of the short beacon message type.

109. The non-transitory computer readable storage medium of claim 107, wherein the first beacon message is of the short beacon message type.

110. A non-transitory computer readable storage medium comprising processor-executable instructions stored thereon configured to cause a processor to execute a method for communicating beacon messages in a base station subsystem comprising an access point and an access terminal, the method comprising:

transmitting beacon messages from the access point to the access terminal, wherein each beacon message is an instance of a full beacon message type or an instance of a short beacon message type;

transmitting a plurality of beacon messages of the short beacon message type, wherein each beacon message in the plurality of beacon messages comprises a physical layer preamble comprising a signal field including a length field; and decoding, at the access terminal, the plurality of beacon messages, wherein the beacon messages in the plurality of beacon messages are decoded as synchronization beacon messages, provided the length field of the beacon messages is set to all zeroes.

111. The non-transitory computer readable storage medium of claim 110, wherein each beacon message decoded as a synchronization beacon messages comprises a subsequent relative position field indicating the sequence position of the synchronizing beacon with respect to the first beacon message in a sequence of beacon messages.

112. The non-transitory computer readable storage medium of claim 111, wherein each beacon message decoded as a synchronization beacon message comprises a subsequent offset field indicating the offset time at which the synchronizing beacon is transmitted with respect to the time the synchronizing beacon was expected to be transmitted.

* * * * *